United States Patent
Paolella et al.

(10) Patent No.: US 11,689,707 B2
(45) Date of Patent: Jun. 27, 2023

(54) TECHNIQUES FOR CALIBRATING A STEREOSCOPIC CAMERA IN A DEVICE

(71) Applicant: ShopperTrak RCT LLC, Chicago, IL (US)

(72) Inventors: Michael J. Paolella, Zurich, IL (US); Spencer Neilan, Chicago, IL (US); Jeffrey R. Rendlen, Chicago, IL (US); Zhiqian Wang, Lisle, IL (US)

(73) Assignee: SHOPPERTRAK RCT LLC, Chicago, IL (US)

( * ) Notice: Subject to any disclaimer, the term of this patent is extended or adjusted under 35 U.S.C. 154(b) by 0 days.

(21) Appl. No.: 16/136,833

(22) Filed: Sep. 20, 2018

(65) Prior Publication Data

US 2020/0099918 A1    Mar. 26, 2020

(51) Int. Cl.
  *G08B 29/20* (2006.01)
  *H04N 13/246* (2018.01)
  *G06T 7/80* (2017.01)

(52) U.S. Cl.
  CPC ............. *H04N 13/246* (2018.05); *G06T 7/85* (2017.01)

(58) Field of Classification Search
  CPC .................................. H04N 13/246; G06T 7/85
  See application file for complete search history.

(56) References Cited

U.S. PATENT DOCUMENTS

| | | | | | |
|---|---|---|---|---|---|
| 4,179,607 A | * | 12/1979 | Lange | ................... | G01T 1/1642 250/363.07 |
| 5,793,879 A | * | 8/1998 | Benn | ...................... | G01N 33/12 382/110 |
| 5,819,016 A | * | 10/1998 | Watanabe | .............. | G01B 11/24 345/419 |
| 6,118,893 A | * | 9/2000 | Li | ............................. | G06T 7/75 382/150 |
| 6,141,009 A | * | 10/2000 | Li | ........................... | G06F 18/40 715/835 |
| 6,289,117 B1 | * | 9/2001 | Li | ............................. | G06T 7/75 382/150 |
| 6,690,393 B2 | * | 2/2004 | Heron | ..................... | G06T 19/00 715/848 |
| 6,874,420 B2 | * | 4/2005 | Lewis, Jr. | ........... | B41F 33/0081 700/125 |
| 7,605,926 B1 | * | 10/2009 | Hetzler | ............. | G01B 9/02057 356/521 |
| 7,774,075 B2 | * | 8/2010 | Lin | ........................ | G06F 3/011 356/600 |
| 7,787,105 B2 | * | 8/2010 | Hipp | ...................... | G01S 17/89 356/5.03 |
| 7,907,166 B2 | * | 3/2011 | Lamprecht | ......... | A61B 1/00193 348/43 |
| 7,943,240 B2 | * | 5/2011 | Zama | .................... | F16F 15/005 428/692.1 |

(Continued)

FOREIGN PATENT DOCUMENTS

JP    2014006179    *    1/2014

*Primary Examiner* — Philip P. Dang
(74) *Attorney, Agent, or Firm* — ArentFox Schiff LLP

(57) ABSTRACT

Techniques for calibrating a device having a stereoscopic camera are disclosed. According to an embodiment, the device calibrates the stereoscopic camera using a target provided by a mobile device. One or more zones each defining an area in a field of view of the calibrated stereoscopic camera are generated. The one or more zones are refined based on input provided by the mobile device.

15 Claims, 5 Drawing Sheets

(56) References Cited

U.S. PATENT DOCUMENTS

| | | | |
|---|---|---|---|
| 7,991,193 B2* | 8/2011 | Hampapur | G06V 20/53 382/103 |
| 8,130,244 B2* | 3/2012 | Cooper | G06T 15/60 345/619 |
| 8,270,678 B2* | 9/2012 | Murray | G06V 10/245 382/128 |
| 8,396,485 B2* | 3/2013 | Grainger | H04W 52/0229 455/456.3 |
| 8,503,763 B2* | 8/2013 | Zhang | H04N 13/221 382/154 |
| 8,504,061 B2* | 8/2013 | Grainger | H04W 4/20 455/412.2 |
| 8,825,140 B2* | 9/2014 | Rice | G01N 21/6456 424/9.6 |
| 8,953,684 B2* | 2/2015 | Cai | H04N 19/597 375/240.16 |
| 9,240,049 B2* | 1/2016 | Ciurea | G02B 27/0075 |
| 9,261,428 B2* | 2/2016 | Hoffmann | G01M 11/068 |
| 9,275,441 B2* | 3/2016 | Marcelpoil | G06V 20/693 |
| 9,327,406 B1* | 5/2016 | Hinterstoisser | B25J 9/1697 |
| 9,369,689 B1* | 6/2016 | Tran | H04N 13/239 |
| 9,384,551 B2* | 7/2016 | Ramaswamy | G06T 7/85 |
| 9,400,937 B2* | 7/2016 | Mishra | G06T 7/11 |
| 9,459,276 B2* | 10/2016 | Joseph | G01C 17/38 |
| 9,460,613 B1* | 10/2016 | Whiting | G06V 40/103 |
| 9,569,786 B2* | 2/2017 | Shaw | G06V 40/20 |
| 9,596,643 B2* | 3/2017 | Paek | B60K 37/06 |
| 9,704,250 B1* | 7/2017 | Shah | H04N 23/676 |
| 9,792,836 B2* | 10/2017 | Rios | G09B 23/30 |
| 9,805,474 B1* | 10/2017 | Whiting | G08G 1/015 |
| 10,063,840 B2* | 8/2018 | Somanath | H04N 13/243 |
| 10,140,855 B1* | 11/2018 | Swaminathan | G01S 13/91 |
| 10,258,309 B2* | 4/2019 | Su | A61B 8/463 |
| 10,335,115 B2* | 7/2019 | Grbic | G06T 7/33 |
| 10,366,472 B2* | 7/2019 | Lelescu | H04N 23/951 |
| 10,373,322 B1* | 8/2019 | Buibas | G06T 7/246 |
| 10,397,495 B1* | 8/2019 | Graber | B64U 80/86 |
| 10,443,981 B2* | 10/2019 | Tinichigiu | G06V 30/142 |
| 10,586,321 B2* | 3/2020 | Leordeanu | G06T 7/12 |
| 10,593,064 B2* | 3/2020 | Ben Moshe | G06T 7/85 |
| 10,599,929 B2* | 3/2020 | Cuban | G06T 7/70 |
| 11,107,150 B2* | 8/2021 | Houston | G06Q 10/02 |
| 11,170,215 B1* | 11/2021 | Sieracki | G06F 18/2453 |
| 2006/0076540 A1* | 4/2006 | Zama | C08G 61/124 252/500 |
| 2010/0085276 A1* | 4/2010 | Cable | G03H 1/2294 345/6 |
| 2011/0261427 A1* | 10/2011 | Hart | G03H 1/26 359/22 |
| 2012/0196062 A1* | 8/2012 | Sato | F03G 7/005 428/394 |
| 2012/0218301 A1* | 8/2012 | Miller | G06Q 30/02 345/633 |
| 2012/0289334 A9* | 11/2012 | Mikhailov | A63F 13/24 463/33 |
| 2013/0271579 A1* | 10/2013 | Wang | G06T 7/593 348/47 |
| 2014/0327944 A1* | 11/2014 | Naidoo | G03H 1/0866 359/9 |
| 2015/0049201 A1* | 2/2015 | Liu | H04L 12/1827 348/189 |
| 2015/0156481 A1* | 6/2015 | Varga | H04N 13/398 348/47 |
| 2016/0012465 A1* | 1/2016 | Sharp | G06Q 20/321 705/14.17 |
| 2016/0343137 A1* | 11/2016 | Skans | G06K 7/1095 |
| 2017/0094251 A1* | 3/2017 | Wolke | G06T 7/593 |
| 2017/0277166 A1* | 9/2017 | Popa-Simil | G05B 19/4184 |
| 2018/0182088 A1* | 6/2018 | Leordeanu | G06T 7/60 |
| 2018/0232859 A1* | 8/2018 | Siddiqui | G06T 5/005 |
| 2018/0242946 A1* | 8/2018 | Grbic | A61B 8/58 |
| 2018/0260601 A1* | 9/2018 | Brebner | G06F 3/011 |
| 2018/0330471 A1* | 11/2018 | Qin | G06F 17/16 |
| 2018/0341818 A1* | 11/2018 | Steffanson | G08B 13/19641 |
| 2019/0019303 A1* | 1/2019 | Siver | H04N 13/189 |
| 2019/0028632 A1* | 1/2019 | Nobori | H04N 13/122 |
| 2019/0035104 A1* | 1/2019 | Cuban | G08B 13/19608 |
| 2019/0043259 A1* | 2/2019 | Wang | G06F 3/012 |
| 2019/0369641 A1* | 12/2019 | Gillett | B64C 37/00 |
| 2020/0005448 A1* | 1/2020 | Subramanian | G01B 11/24 |

* cited by examiner

TECHNIQUES FOR CALIBRATING A STEREOSCOPIC CAMERA IN A DEVICE

BACKGROUND

Embodiments disclosed herein generally relate to a counting system, and more particularly, to calibrating the counting system, e.g., via a mobile device.

Generally, a counting system may track objects, such as individuals passing through one or more areas within the field of view of a camera of the counting system, and maintain a count of each object. The counting system may include multiple devices that serve various functions. Prior to use, the counting system is calibrated to ensure that individuals are accurately tracked for the given area (or areas) being monitored. However, the calibration process often requires extensive tuning and can still be subject to repeated trial and error to achieve accuracy. As a result, performance of the counting system may be significantly impacted.

SUMMARY

Embodiments disclosed herein provide a method for calibrating a device having a stereoscopic camera. The method generally includes calibrating the stereoscopic camera using a target provided by a mobile device. The method also includes generating one or more zones each defining an area in a field of view of the calibrated stereoscopic camera. The method also generally includes refining the one or more zones based on input provided by the mobile device.

Another embodiment disclosed herein provides a computer-readable storage medium storing instructions, which, when executed, performs an operation for calibrating a device having a stereoscopic camera. The operation itself generally includes calibrating the stereoscopic camera using a target provided by a mobile device. The operation also includes generating one or more zones each defining an area in a field of view of the calibrated stereoscopic camera. The operation also generally includes refining the one or more zones based on input provided by the mobile device.

Yet another embodiment disclosed herein provides a system having one or more processors and a memory. The memory stores program code, which, when executed by the one or more processors, performs an operation for calibrating a device having a stereoscopic camera. The operation itself generally includes calibrating the stereoscopic camera using a target provided by a mobile device. The operation also includes generating one or more zones each defining an area in a field of view of the calibrated stereoscopic camera. The operation also generally includes refining the one or more zones based on input provided by the mobile device.

In accordance with these and other objectives that will become apparent hereafter, the present disclosure will be described with particular references to the accompanying drawings.

DETAILED DESCRIPTION

This detailed description is presented in terms of programs, data structures or procedures executed on a computer or a network of computers. The software programs implemented by the system may be written in languages such as JAVA, C, C++, C#, Assembly language, Python, PHP, or HTML. However, one of skill in the art will appreciate that other languages may be used instead, or in combination with the foregoing.

Figure 1:
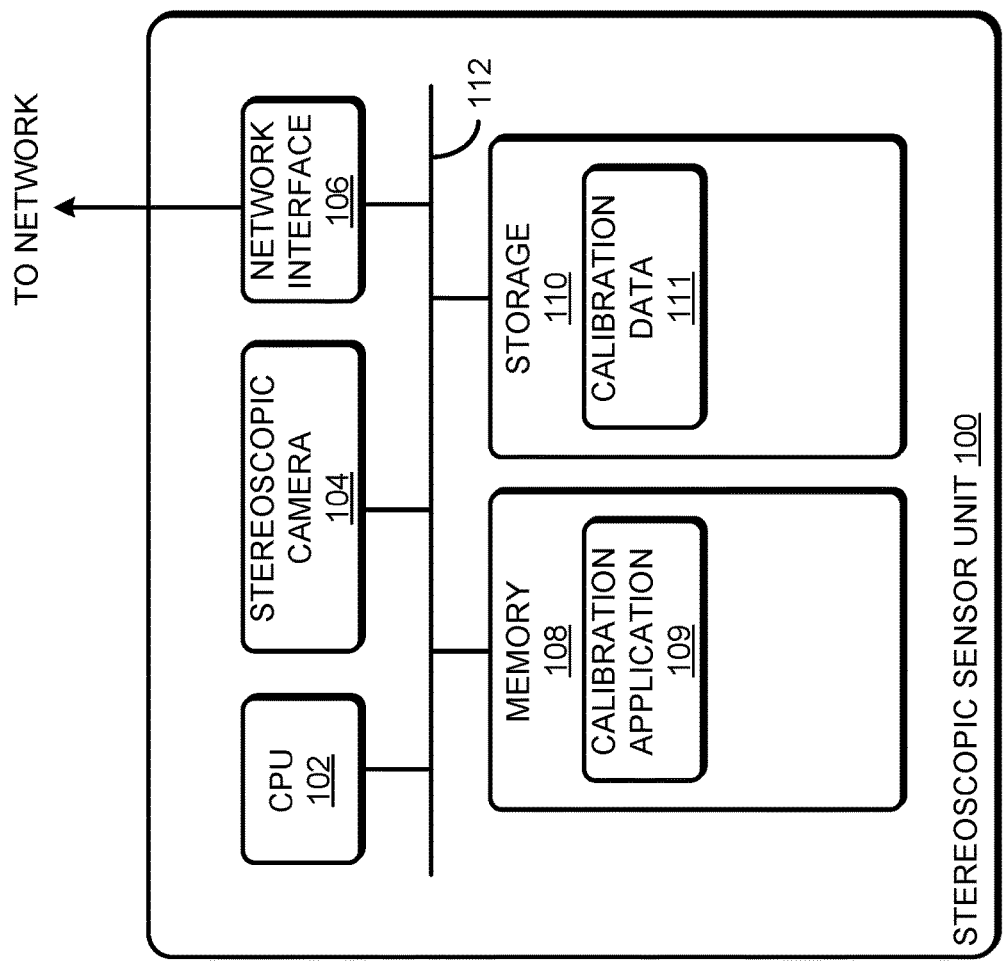
FIG. 1 illustrates an example stereoscopic sensor unit configured to provide calibration via a mobile device.

FIG. 1 illustrates an example stereoscopic sensor unit 100 configured be calibrated, e.g., via a tool executing on a mobile device. In some embodiments, the stereoscopic sensor unit 100 is representative of a counting system (or a component of the counting system) that can be used, e.g., in a retail store or other environment. For instance, the counting system may monitor consumer traffic patterns at facilities such as malls or stores. The counting system may identify objects entering and exiting a given area, track the objects across the area, and maintain a count of those objects passing through the area.

As shown, the stereoscopic sensor unit 100 includes, without limitation, a central processing unit (CPU) 102, a stereoscopic camera 104, a network interface 106, memory 108, and storage 110. Each of these components may be interconnected via an interconnect bus 112.

The CPU 102 retrieves and executes programming instructions stored in memory 108 and stores and retrieves application data residing in storage 110. The bus 112 is used to transmit programming instructions and data between CPU 102, storage 110, network interface 106, and memory 108. The CPU 102 is representative of a single CPU but may also be multiple CPUs, a single CPU having multiple processing cores, and the like. The memory 108 is generally included to be representative of a random access memory. The storage 110 may be a disk drive storage device. Although shown as a single unit, storage 110 may be a combination of fixed and/or removable storage devices, such as fixed disc drives, removable memory cards, or optical storage, network attached storage (NAS), or a storage area network (SAN).

The stereoscopic camera 104 may include multiple sensor lenses (e.g., camera lenses) to capture image data, which the storage 110 may temporarily maintain. The memory 108 may include program code logic to direct the stereoscopic camera 104 to capture image data. The program code may also identify individuals in the image data (e.g., using the techniques described above) for counting data. The network interface 106 may be embodied as any communication circuit, device, or collection thereof, capable of enabling communications over a network (e.g., a local area network, the Internet, etc.) between the stereoscopic sensor unit 100 and other devices. Further, the network interface 106 allows the stereoscopic sensor unit 100 to establish a connection via a wireless protocol, such as BLUETOOTH, though any kind of radio frequency protocol may be used.

The memory 108 further includes a calibration application 109 to configure components within the stereoscopic sensor unit 100. For example, the calibration application 109 may communicate with remote devices for calibrating components of the stereoscopic sensor unit 100, such as the stereoscopic camera 104. In such an example, the calibration application 109 provides a communication interface for a mobile application executing on a mobile device, in which the mobile application itself provides a user interface to configure the stereoscopic sensor unit 100, allowing a user to customize calibration settings for the stereoscopic sensor unit 100. For instance, during installation of the stereoscopic sensor unit 100 in a location, such as at the entrance of a retail setting, the calibration application 109 may cause the mobile application to generate an image used to calibrate the stereoscopic camera 104, as further described herein.

As another example, the calibration application 109 may generate one or more positioning instructions that instruct a user to walk within various portions of a field of view of the stereoscopic camera 104. Advantageously, doing so allows the calibration application 109 to automatically detect counting zones that are indicative of areas in which individual traffic is to be counted. The calibration application 109 may define the zones and transmit data regarding the zones for further customization by the mobile application. Once calibrated, the calibration application 109 may store the calibration data 111.

Figure 2:
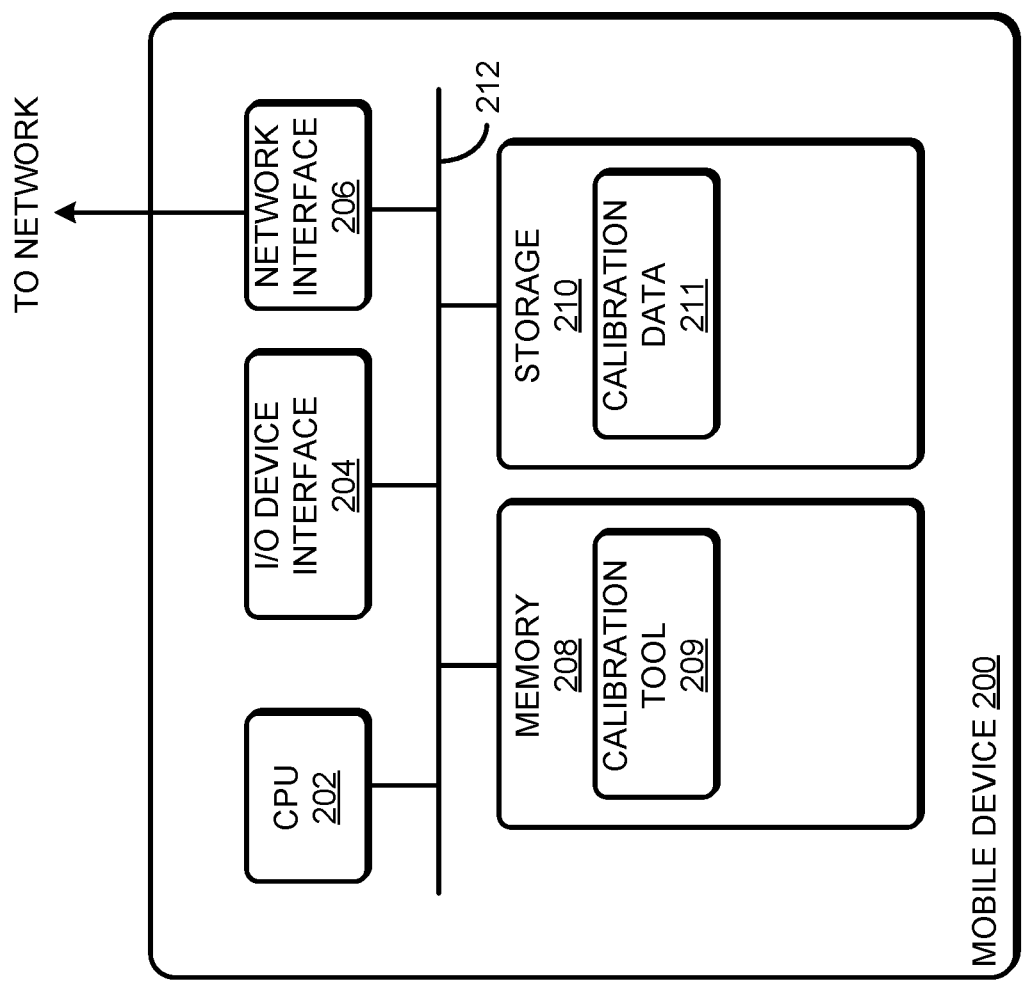
FIG. 2 illustrates an example mobile device configured to calibrate the stereoscopic sensor unit described relative to FIG. 1.

FIG. 2 illustrates an example mobile device 200 configured to calibrate the stereoscopic sensor unit 100. As shown, the stereoscopic sensor unit 100 includes, without limitation, a central processing unit (CPU) 202, an I/O device interface 204, a network interface 206, memory 208, and storage 210. Each of these components may be interconnected via an interconnect bus 212. In some embodiments, the mobile device 200 can be representative of a smartphone device, tablet computer, wearable device, and the like.

The CPU 202 retrieves and executes programming instructions stored in memory 208 as well as stores and retrieves application data residing in the storage 210 (e.g., calibration data 211). The bus 212 is used to transmit programming instructions and data between CPU 202, storage 210, network interface 206, and memory 208. Note, the CPU 202 representative of a single CPU but multiple CPUs, a single CPU having multiple processing cores, and the like may also be included. The memory 208 is generally included to be representative of a random access memory. The storage 210 may be a disk drive storage device. Although shown as a single unit, storage 210 may be a combination of fixed and/or removable storage devices, such as fixed disc drives, removable memory cards, or optical storage, network attached storage (NAS), or a storage area network (SAN).

The I/O device interface 204 allows various I/O devices (e.g., keyboards, mouse devices, and the like) to connect with the mobile device 200 and communicate with hardware and software components of the mobile device 200. The network interface 206 may be embodied as any communication circuit, device, or collection thereof, capable of enabling communications over a network (e.g., a local area network, the Internet, etc.) between the mobile device 200 and other devices, such as the stereoscopic sensor unit 100. Further, the network interface 206 allows the mobile device 200 to establish a connection via a wireless protocol, such as BLUETOOTH, though any kind of radio frequency protocol may be used.

The memory 208 further includes a calibration tool 209 to communicate with the calibration application 109 for calibrating components of the stereoscopic sensor unit 100, such as the stereoscopic camera 104. The calibration tool 209 may be a mobile application that provides a graphical user interface. A user may interact with the interface to, e.g., generate a calibration target used to calibrate the stereoscopic camera 104, retrieve positioning instructions from the calibration application 109 to identify counting zones within the field of view of the calibrated stereoscopic camera 104, and refine the counting zones as needed. Storage 210 may maintain calibration data 211, which may be embodied as any data used in calibrating the stereoscopic sensor unit 100. Advantageously, the calibration tool 209 provides a vision-based application that guides a user through complex calibration of the components of the stereoscopic sensor unit 100. For example, the calibration tool 209 can display a live feed of the stereoscopic sensor unit 100 that allows the user to view counting zones that have been defined by the calibration application 109. Doing so in turn allows the user to customize the counting zones as needed.

Figure 3:
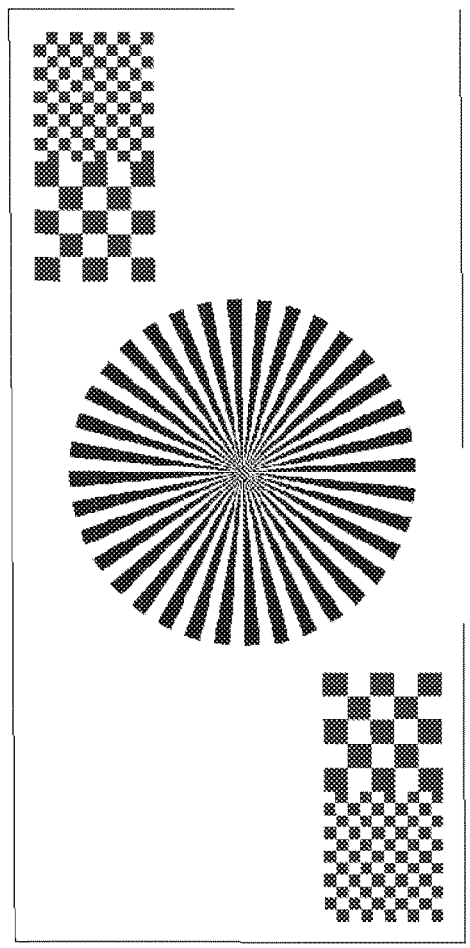
FIG. 3 illustrates an example calibration target used by the stereoscopic sensor unit and mobile device to calibrate the stereoscopic sensor unit.

FIG. 3 illustrates an example calibration target 300 used by the stereoscopic sensor unit 100 and mobile device 200 to calibrate the stereoscopic sensor unit 100. In some cases, the calibration tool 209 may generate the calibration target 300. For instance, the calibration application 109 may transmit an image indicative of the calibration target 300 to the calibration tool 209 for display on the mobile device 200. As another example, the calibration tool 209 may generate a distinct image that can be scanned by the calibration application 109 (e.g., a QR code). In other cases, the calibration target 300 may be representative of a physical object that can be scanned by the calibration application 109. For example, the physical object may be a printed image (e.g., a QR code and the like) or a strip of a given length (e.g., one meter) with a distinct pattern that the calibration application 109 is configured to automatically detect once captured by the stereoscopic camera 104.

In an embodiment, the stereoscopic sensor unit 100 is configured to scan the calibration target 300 to determine configuration parameters for calibrating components within the stereoscopic sensor unit 100, such as the stereoscopic camera 104. To do so, the calibration tool 209 may direct the calibration target 300 (e.g., displayed on the mobile device 200) to be positioned within the field of view of the stereoscopic camera 104. For example, the calibration application 109 may transmit instructions to the calibration tool 209 to be presented on the mobile device 100. The instructions may direct the mobile device 200 to be placed at a location under the stereoscopic camera 104 or some other location. Once positioned, the stereoscopic sensor unit 100 may scan the calibration target 300. Thereafter, the stereoscopic sensor unit 100 can generate configuration parameters such as a distance between the stereoscopic sensor unit 100 and the calibration target 300, lighting relative to the stereoscopic sensor unit 100 and the calibration target 300, a position of the calibration target 300 relative to the stereoscopic sensor unit 100, and the like. In some embodiments, the calibration target 300 may also have data embedded therein, such as predefined values to be used in calibration. Once scanned, the stereoscopic sensor unit 100 may apply such values to components within the stereoscopic sensor unit 100, such as the stereoscopic camera 104.

Figure 4:
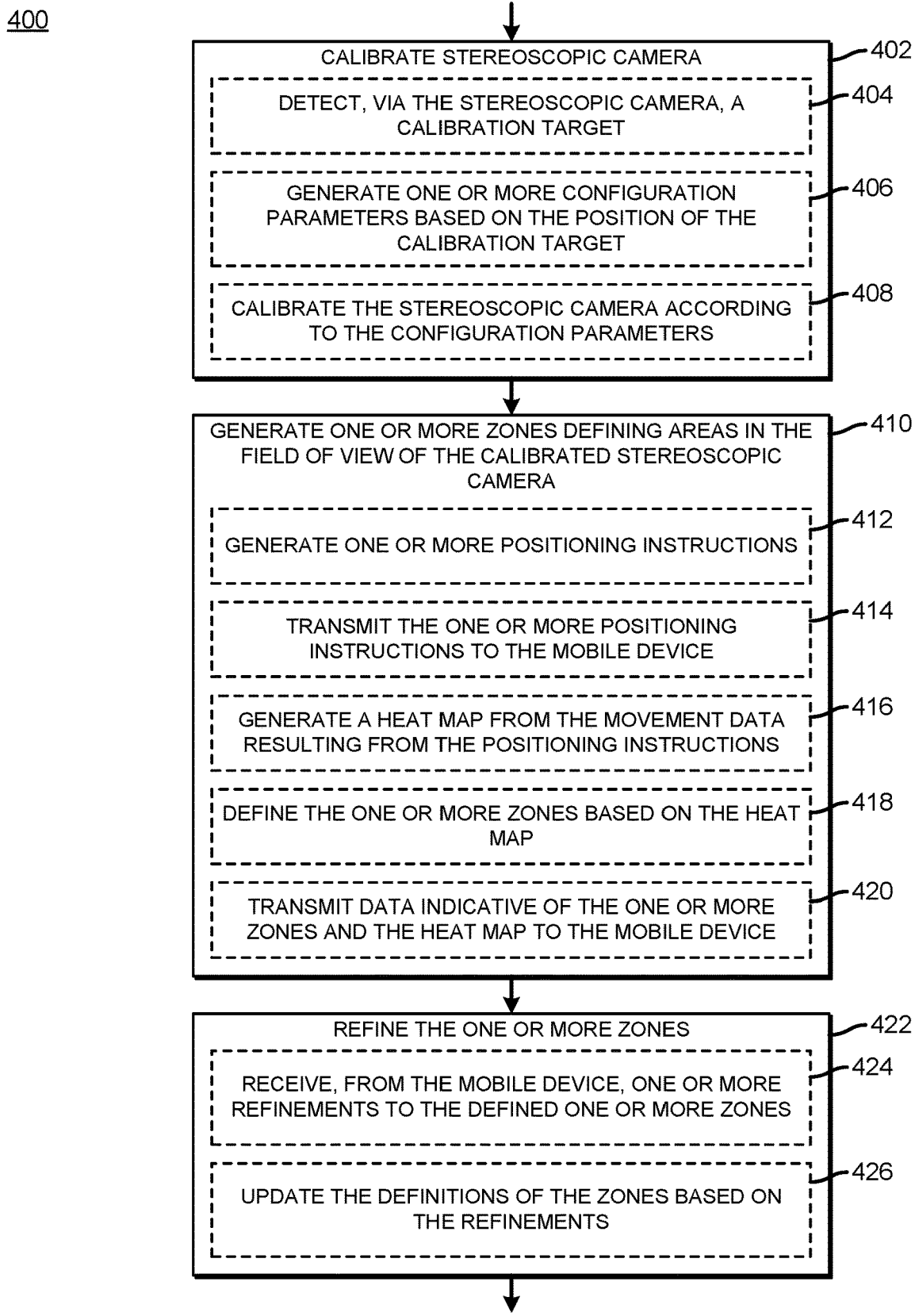
FIG. 4 illustrates an example flow of a method for calibrating the stereoscopic sensor unit described relative to FIG. 1.

FIG. 4 illustrates an example flow of a method 400 for calibrating the stereoscopic sensor unit 100. The stereoscopic sensor unit 100 (e.g., via the calibration application 109) may perform the method 400 in various situations, such as during installation of the stereoscopic sensor unit 100 in a facility (e.g., a retail shop) or in response to a request for calibration by the mobile device 200. As shown, the method 400 begins in block 402, in which the stereoscopic sensor unit 100 calibrates the stereoscopic camera 104. For example, assume that the calibration application 109 directs the mobile device 200 to position a calibration target in a certain location relative to the stereoscopic sensor unit 100.

In block 404, the calibration application 109 detects, via the stereoscopic camera 104, the calibration target.

In block 406, the calibration application 109 generates one or more configuration parameters based on the positioning of the calibration target relative to the stereoscopic sensor unit 100. For example, the calibration application 109 may determine a distance from the calibration target to the stereoscopic sensor unit 100 (e.g., if the calibration target is positioned on the floor, the stereoscopic sensor unit 100 may calculate distance from the stereoscopic sensor unit 100 to the floor), a positioning of the calibration target relative to the stereoscopic sensor unit 100, and ambient settings based on an image capture of the calibration target by the stereoscopic camera 104. As stated, the calibration target may also include embedded data used by the calibration application 109 to calibrate the stereoscopic camera 104. In block 408, the calibration application 109 calibrates the stereoscopic camera 104 according to the configuration parameters. For example, the calibration application 109 may apply values determined from the configuration parameters (e.g., distance of camera to floor) to the stereoscopic camera 104.

In block 410, the calibration application 109 generates one or more zones for the field of the calibrated stereoscopic camera. Each zone may be indicative of an area within the field of view in which distinct counts can be obtained. To identify zones within a field of view of the stereoscopic camera 104, the calibration application 109 identifies areas in the field of view having distinct traffic. For instance, in many settings, a field of view can be subdivided into a door zone (in which individuals enter the field of view from an entrance of the setting) and an interior zone (in which individuals may traverse through a portion of the setting further from the entrance). As another example, assume that the field of view has a kiosk in one end and a shelf on the other. In practice, each the kiosk and the shelf may have distinct counts of foot traffic and thus can be counted as separate zones. Each zone may be defined using a heat map generated by the calibration application 109.

In block 412, the calibration application 109 generates one or more positioning instructions used by the mobile device 200. The positioning instructions may direct that the mobile device 200 to be placed in an area (e.g., by a user carrying the mobile device 200), e.g., instructing the user to walk across a certain area within the field of view of the stereoscopic sensor unit 100 and hold the position for a predetermined amount of time. The positioning instructions may include visual and textual directions for the mobile device 200 to establish systematic movement between areas within the field of view of the stereoscopic camera 104. Doing so allows the calibration application 109 to identify an initial set of counting zones for the mobile device 200 to confirm.

In block 414, the calibration application 109 transmits the positioning instructions to the mobile device 200 for display thereon. A user of the mobile device 200 may position the mobile device 200 based on the instructions received from the calibration application 109. The mobile device 200 may send the calibration application 109 movement data (e.g., accelerometer and gyroscope data produced within the mobile device 200), which the calibration application 109 may, in turn, correlate to a current position of the mobile device 200 within the field of view. In some embodiments, the stereoscopic sensor unit 100 uses input image data from the stereoscopic camera 104 to determine movement data (e.g., via image processing techniques to discern moving foreground objects in a background scene).

In block 416, the stereoscopic sensor unit 100 generates a heat map from the movement data once the movement data exceeds a specified threshold. The heat map may be used to generate a zoning template, e.g., zones that are automatically identified by the stereoscopic sensor unit 100 based on the movement data. For instance, areas in the heat map having a relatively high amount of movement data (or otherwise exceeding a specified threshold) can correspond to a counting zone.

In block 418, the calibration application 109 defines one or more zones based on the heat map to create the zoning template. For example, the calibration application 109 may automatically attribute an area with a high amount of movement data during the positioning process as a zone. Once defined, the calibration application 109 may store the definition in a configuration (e.g., the calibration data 111). In block 420, the calibration application 109 transmits the data indicative of the one or more zones and the heat map for display on the mobile device 200. For example, the calibration application 109 may stream a live feed of the stereoscopic camera 104 to the mobile device 200. The zones may be defined in the display as bounded boxes overlaying areas indicative of the zones in the live feed. Displaying the automatically defined zones on the mobile device 200 advantageously provides an opportunity for the user to refine such zones via the calibration tool 209 on the mobile device 200.

In block 422, the calibration application 109 refines the one or more zones. For instance, continuing the example, the calibration application 109 may receive, from the calibration tool 209 of the mobile device 200, one or more refinements to the defined zones. The refinements may be an extension of the bounded box, a minimization of a given bounded box, a removal of the bounded box, and the like. The refinements may also include a labeling of a defined zone. In block 426, the calibration application 109 updates the definitions of the zones based on the refinements. For example, to do so, the calibration application 109 may update the definitions in the stored calibration data 111. The calibration application 109 may continue the calibration and refinement process until the mobile device 200 acknowledges that the calibration is complete.

Figure 5:
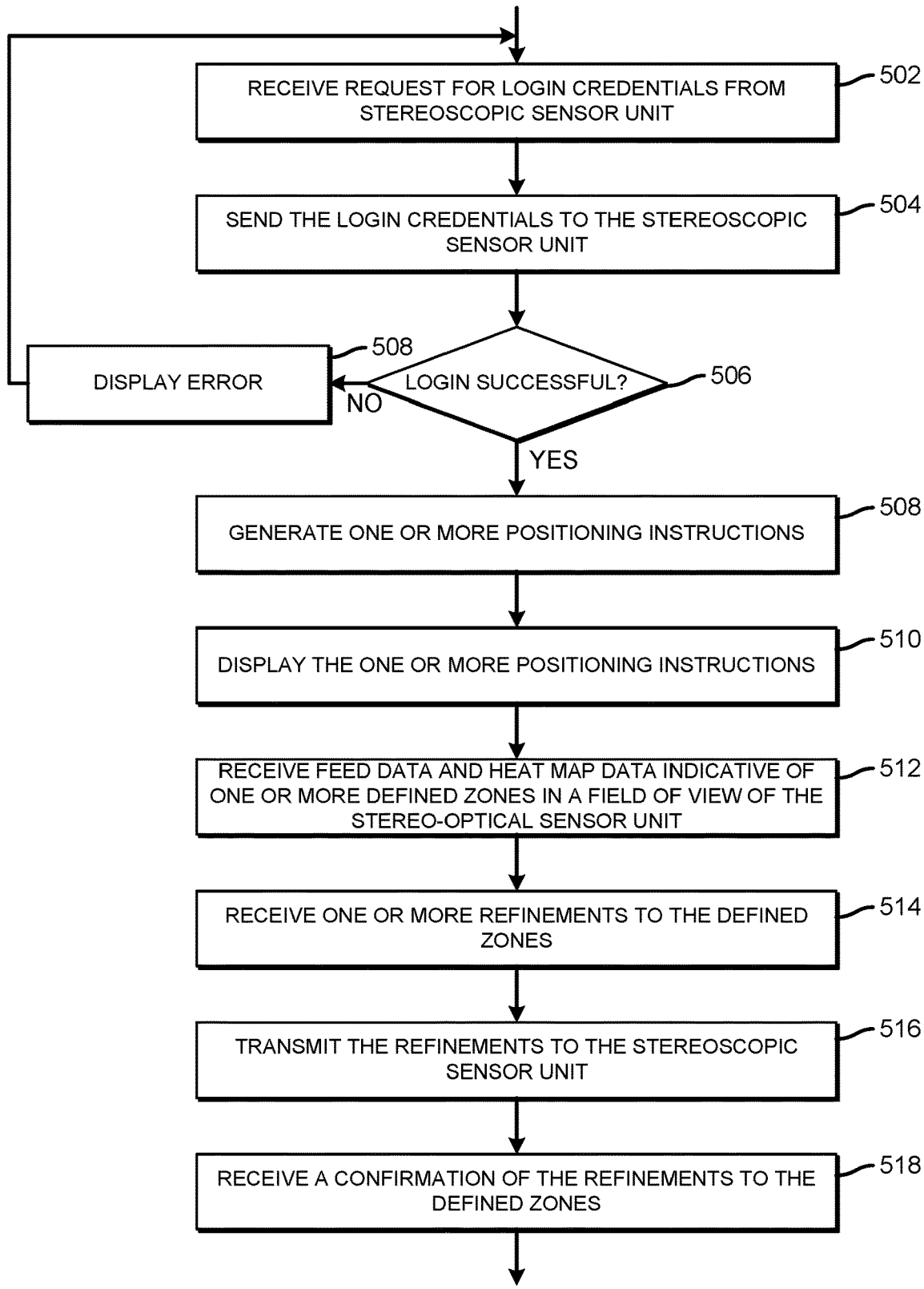
FIG. 5 illustrates an example flow of a method for calibrating the stereoscopic sensor unit described relative to FIG. 1 via the mobile device described relative to FIG. 2.

FIG. 5 illustrates an example flow of a method 500 for calibrating the stereoscopic sensor unit 100. More particularly, the mobile device 200 may carry out the method 500 via the calibration tool 209 to calibrate the stereoscopic sensor unit 100, e.g., during initialization or installation of the stereoscopic sensor unit 100 in a facility. As shown, the method 500 begins in block 502, in which the calibration tool 209 receives a request for login credentials from the stereoscopic sensor unit 100 (e.g., via the calibration application 109). In block 504, the calibration tool 209 may send the login credentials to the stereoscopic sensor unit 100. For instance, a user may provide a login and password input that is then transmitted to the calibration application 109. In block 506, the calibration tool 209 determines whether the login was successful. For instance, if successful, the calibration application 109 may transmit an acknowledgement of a successful login to the calibration tool 209. If the login is not successful, then at block 508, the calibration tool 209 displays an error indicative of an unsuccessful login to the mobile device 200. Otherwise, in block 508, the calibration tool 209 generates one or more positioning instructions for moving the mobile device 200 within field of view of the camera. Alternatively, the calibration tool 209 may receive the positioning instructions from the calibration application 109.

In block 510, the calibration tool 209 may display the one or more positioning instructions on the mobile device 200. In response, a user may position the mobile device 200 according to the positioning instructions. In turn, the stereoscopic sensor unit 100 may generate a heat map based on movement of the mobile device 200 made in response to the positioning instructions. Further, the stereoscopic sensor unit 100 may automatically defines one or more zones within field of view of the stereoscopic camera 104 based on the heat map.

In block 512, the calibration tool 209 receives feed data and heat map data indicative of the defined zones. The calibration tool 209 may present the feed to the display of the mobile device 200 including the defined zone information. The calibration tool 209 may allow the user to refine the zones via an interface provided by the calibration tool 209. In block 514, the calibration tool 209 receives user input indicative of refinements to the defined zones. For example, the refinements may be a redrawing of the zones by the user. In block 516, the calibration tool 209 transmits the refinements to the stereoscopic sensor unit 100. In block 518, the calibration tool 209 receives a confirmation of the refinements to the defined zones. The refinement process may continue until the user (via an interface for the calibration tool 209) or the calibration application 109 indicates that the calibration is complete.

Note, in some embodiments, rather than authenticating the mobile device 200 via login credentials to allow the mobile device 200 to calibrate the stereoscopic sensor unit 100, the mobile device 200 may establish a connection with the stereoscopic sensor unit 100 using a wireless protocol, such as BLUETOOTH (or some other radio frequency protocol). For instance, a user may hold a reset pin button on the stereoscopic sensor unit 100 for a predetermined amount to time and trigger the pairing process to connect the mobile device 200 with the stereoscopic sensor unit 100.

Aspects of the present disclosure may be embodied as a system, method, or computer-readable storage medium. Accordingly, aspects of the present disclosure may take the form of an entirely hardware-based embodiment, an entirely software-based embodiment (e.g., firmware, resident software, micro-code, etc.), or an embodiment combining software and hardware aspects. Further, aspects of the present disclosure may take the form of a computer-readable storage medium having computer-readable instructions embodied thereon.

Any combination of one or more computer-readable storage media may be used. The computer-readable medium may be a computer-readable signal medium or a computer-readable storage medium. A computer-readable storage medium may include an electronic, magnetic, optical, electromagnetic, infrared, semiconductor system, apparatus, device, or any suitable combination of the foregoing. More specific examples include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium may be any tangible medium that may contain or store a program for use by or in connection with an instruction execution system, apparatus, or device.

It will be readily understood that components of the embodiments as generally disclosed herein and illustrated in the appended figures could be arranged and designed in a wide variety of different configurations. Thus, the following and more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment. Many modifications and variations are possible in view of the above disclosure. The embodiments were chosen and described to best explain the principles of the present disclosure and practical applications to thereby enable one of ordinary skill in the art to best use the present disclosure as may be suited to the particular use that is contemplated.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to". The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A computer-implemented method for calibrating a device having a stereoscopic camera, the method comprising:
   calibrating the stereoscopic camera using a target displayed on a mobile device, the calibrating comprising:
      detecting, via the stereoscopic camera, the target;
      generating one or more configuration parameters based on a position of the target relative to the stereoscopic camera; and
      calibrating the stereoscopic camera according to the configuration parameters;
   generating one or more counting zones each defining an area in a field of view of the calibrated stereoscopic camera; and
   refining at least one defined area of a counting zone of the one or more counting zones based on input provided by the mobile device, the refining comprising:
      receiving input indicative of one or more refinements to at least one defined area of a counting zone of the one or more counting zones from the mobile device; and
      updating definitions associated with the counting zone of the one or more counting zones based on the refinements.

2. The method of claim 1, wherein the configuration parameters include information representative of at least one of the following: a distance of the target from the stereoscopic camera, a lighting of the target relative to the stereoscopic camera, and a position of the target relative to the stereoscopic camera.

3. The method of claim 1, wherein generating the one or more counting zones comprises:
   generating one or more positioning instructions for the mobile device;
   generating a heat map from movement data provided by the mobile device; and
   defining the one or more counting zones based on the heat map.

4. The method of claim 3, further comprising:
   transmitting data indicative of the one or more counting zones and the heat map to the mobile device.

5. The method of claim 1, further comprising:
   sending a login request to the mobile device; and
   receiving login credentials responsive to the request from the mobile device.

6. A non-transitory computer-readable storage medium storing instructions, which, when executed, performs an operation for calibrating a device having a stereoscopic camera, the operation comprising:
   calibrating the stereoscopic camera using a target displayed on a mobile device, the calibrating comprising:
      detecting, via the stereoscopic camera, the target;
      generating one or more configuration parameters based on a position of the target relative to the stereoscopic camera; and
      calibrating the stereoscopic camera according to the configuration parameters;
   generating one or more counting zones each defining an area in a field of view of the calibrated stereoscopic camera; and
   refining at least one defined area of a counting zone of the one or more counting zones based on input provided by the mobile device, the refining comprising:
      receiving input indicative of one or more refinements to at least one defined area of a counting zone of the one or more counting zones from the mobile device; and
      updating definitions associated with the counting zone of the one or more counting zones based on the refinements.

7. The computer-readable storage medium of claim 6, wherein the configuration parameters include information representative of at least one of the following: a distance of the target from the stereoscopic camera, a lighting of the target relative to the stereoscopic camera, and a position of the target relative to the stereoscopic camera.

8. The computer-readable storage medium of claim 6, wherein generating the one or more counting zones comprises:
   generating one or more positioning instructions for the mobile device;
   generating a heat map from movement data provided by the mobile device; and
   defining the one or more counting zones based on the heat map.

9. The computer-readable storage medium of claim 8, wherein the operation further comprises:
   transmitting data indicative of the one or more counting zones and the heat map to the mobile device.

10. The computer-readable storage medium of claim 6, wherein the operation further comprises:
    sending a login request to the mobile device; and
    receiving login credentials responsive to the request from the mobile device.

11. A system, comprising:
    one or more processors; and
    a memory storing program code, which, when executed by the one or more processors, performs an operation for calibrating a device having a stereoscopic camera, the operation comprising:
       calibrating the stereoscopic camera using a target displayed on a mobile device, the calibrating comprising:
          detecting, via the stereoscopic camera, the target;
          generating one or more configuration parameters based on a position of the target relative to the stereoscopic camera; and
          calibrating the stereoscopic camera according to the configuration parameters;
       generating one or more counting zones each defining an area in a field of view of the calibrated stereoscopic camera, and
       refining at least one defined area of a counting zone of the one or more counting zones based on input provided by the mobile device, the refining comprising:
          receiving input indicative of one or more refinements to at least one defined area of a counting zone of the one or more counting zones from the mobile device; and
          updating definitions associated with the counting zone of the one or more counting zones based on the refinements.

12. The system of claim 11, wherein the configuration parameters include information representative of at least one of the following: a distance of the target from the stereoscopic camera, a lighting of the target relative to the stereoscopic camera, and a position of the target relative to the stereoscopic camera.

13. The system of claim 11, wherein generating the one or more counting zones comprises:
    generating one or more positioning instructions for the mobile device;
    generating a heat map from movement data provided by the mobile device;
    defining the one or more counting zones based on the heat map; and transmitting data indicative of the one or more counting zones and the heat map to the mobile device.

14. The system of claim 11, wherein the operation further comprises:
sending a login request to the mobile device; and
receiving login credentials responsive to the request from the mobile device.

15. The system of claim 13, wherein the operation further comprises:
transmitting data indicative of the one or more counting zones and the heat map to the mobile device.

* * * * *